United States Patent Office 3,255,275
Patented June 7, 1966

3,255,275
PROCESS FOR ENHANCING THE DYE-RECEPTIV-
ITY OF CONTINUOUS, COHERENT ARTICLES
AND PRODUCTS THEREFROM
Wilhelm E. Walles, William F. Tousignant, and Floyd E.
Romesberg, Midland, Mich., and Alice E. Emmert,
Summit, N.J., assignors to The Dow Chemical Company, Midland, Mich., a corporation of Delaware
No Drawing. Filed Jan. 30, 1961, Ser. No. 85,480
18 Claims. (Cl. 260—895)

This invention relates to an improved process for enhancing the dye-receptivity of various continuous, coherent articles including films, fibers, filaments, tapes, ribbons, and the like prepared from organic, thermoplastic, resinous materials. More particularly, it is concerned with enhancing the dye-receptivity of such articles which have been prepared from latexes of those polymeric materials.

In U.S. Serial No. 742,069 filed June 16, 1958, by J. E. Costa et al. and now abandoned, there is disclosed a process for preparing filamentary articles by the continuous localized coagulation of a latex of an organic, thermoplastic, resinous material into the form of a sheet of coagulum which is subsequently slit into tapes or ribbons which in turn are fused and shaped. The therein disclosed process is applicable for providing a wide variety of cross-sectional configurations and of articles having wide differences in denier and other characteristics and is suitable for use with an unusually wide variety of polymeric materials. However, as is common in the synthetic man-made fiber art, the hydrophobic filamentary articles prepared thereby are characterized by a limited receptivity to dyes. This limited dyeability is a severe curtailment to maximum exploitation of those filamentary articles in the manufacture of cloth, fabric, and other textile materials.

Many techniques and procedures have been suggested and have been employed for improving the dye-receptivity of many synthetic man-made fibers, filaments, and films. Exemplary of these is the copolymerization into the polymer of a monomeric material having dye-receptive functional groups. This procedure, however, requires in effect the tailor making of a polymer for each of many different end uses. In addition, copolymerization frequently presents obstacles to the preparation and manufacture of a useful fiber-forming polymeric material. Other procedures for improving dye-receptivity incorporate additives into the polymeric material before spinning or into certain intermediate stages of the filament while it is being spun so as, in effect, to alloy such additive with the fiber-forming polymer. Typical of the additives that have found utility in that technique is polyvinyl pyrrolidone. These additive materials have, in general, found rather wide acceptance, albeit specific applicability with some fibers. When used with polymers such as vinylidene chloride polymers, some of the additives have actually caused a degradation thereof.

The coloring of self-supporting films has not generally benefited from these prior concepts. Usually the coloring of films requires the inclusion of dyes, pigments, or colorants into the formulation from which the film is to be made. The disadvantages and limitations of such procedures are readily evident.

In view of the above problems concerning the limited dyeability of continuous, coherent articles such as the synthetic man-made fibers in general and the latex spun fibers in particular, as well as films and the like, it would be desirable to have an effective and efficient process for improving the dyeability of those articles formed from organic, thermoplastic, resinous polymeric materials. Accordingly, the provision of such a process is the principal object of the present invention.

An associated object is the provision of such a process wherein the continuous, coherent articles are formed by the continuous localized coagulation of a latex of such polymeric materials.

An allied object is the provision of such a process wherein a dye-assisting adjuvant is incorporated into the article while permitting the article to retain its other desirable properties.

The above and related objects are accomplished by means of the process comprising the sequence of (1) immersing a microporous coagulum of an organic, thermoplastic, resinous material in a solution of an azotic polymeric dye-assisting adjuvant; (2) drying the so-treated microporous coagulum at a temperature below the fusion temperature of said organic, thermoplastic, resinous material; and (3) subjecting the so-treated dried microporous coagulum to elevated temperature to fuse said coagulum into a continuous, coherent, integral article.

In a preferred embodiment of the concept, the process comprises the procedural sequence of (1) forming a continuous, coherent, microporous coagulum by the localized electrolyte coagulation at a temperature below the fusion temperature of the resinous material of an electrolyte coagulable film-forming latex of an organic, thermoplastic, resinous material; (2) washing said continuous, coherent, microporous coagulum with water to remove substantially all of the electrolyte coagulant; (3) draining and volatilizing excess water from the washed coagulum without destroying the microporous structure; (4) immersing said coagulum in a solution of an azotic polymeric dye-assisting adjuvant; (5) drying the so-treated coagulum at a temperature below the fusion temperature of the organic, thermoplastic, resinous material; and (6) subjecting the so-treated dry coagulum to elevated temperature to fuse said coagulum into a continuous, coherent, integral article.

The term, coagulum, is used in the present application in the connotation of a continuous article formed from a partial coalescense of a multiplicity of particles of a resinous material in such a manner that there are voids between the particles which, in the whole, result in interconnected channels.

The porous coagula useful in the present method may be of any organic, thermoplastic, resinous material. As materials which may be advantageously used are the normally crystalline polymeric materials. These are the polymers which have a tendency to form crystallites or sites where small segments of a plurality of the polymer chains are oriented and held in position by secondary valence forces. This crystallite formation or crystallinity is usually visible when the polymers are examined by X-ray diffraction. Typical of the normally crystalline polymeric materials falling within the advantageous definition are the polymers and copolymers of at least 70% by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloroprene. Known ternary compositions also may be employed advantageously. Representative of such polymers are those composed of at least 70% by weight of vinylidene chloride with the remainder made up of, for example, acrolein and vinyl chloride; acrylic acid and acrylonitrile; alkyl acrylates and alkyl methacrylates; acrylonitrile and butadiene; acrylonitrile and itaconic acid; acrylonitrile and vinyl acetate, vinyl propionate, or vinyl chloride; allyl esters or ethers and vinyl chloride; butadiene and vinyl acetate, vinyl propionate, or vinyl chloride; and vinyl ethers and vinyl chloride. Quaternary polymers of similar monomeric composition will also be known. It has been found that the normally crystalline copolymers composed of from about 92 to 99% by weight of vinylidene chloride and correspondingly from 8 to 1% by weight of acrylonitrile or of a lower alkyl acrylate having alkyl groups of 1 to 8 carbon atoms are well adapted for use in the manipulative steps in the article-forming processes, and result in exceptionally useful articles. For these reasons these vinylidene chloride-acrylonitrile and vinylidene chloride-alkyl acrylate copolymers represent preferred species for use herein. It should be understood, however, that the process is not limited to the treatment of normally crystalline polymers but that any non-elastic polymeric material which has film-forming characteristics in latex form or which can form a continuous, microporous structure may be employed. There are many materials, such as polyvinyl chloride and polystyrene, which are capable of forming continuous, coherent articles from the form of a latex or other form which do not normally form crystallites. It is also possible to employ interpolymers having polymerizable light and heat stabilizers polymerized within the resinous material. Also operable in the present method are the tapes made from dispersions of polymeric materials, such as the polyolefins including, for example, polyethylene, polypropylene, copolymers of ethylene and propylene, and polyisobutylene. Equally useful in the method are the condensation polymers, such as the polyamides including polyhexamethylene diadipamide, and the polyesters including polyethylene terephthalate. Also of utility are the microporous structures of rubber hydrochloride, regenerated cellulose, and synthetic cellulose derivatives including cellulose esters, such as cellulose acetate. It should be apparent that any organic, thermoplastic, resinous material which is capable of being formed into a microporous coagulum or deposit will find utility in the present invention.

The polymer latexes and latex-like dispersions useful in the previously referred-to-preferred coagulum-forming process are those which are electrolyte coagulable into a continuous, microporous, coherent coagulum. It is not essential that the continuous, coherent coagulum resulting from the electrolyte coagulation be self-supporting, impermeable, transparent, or commercially useful by air drying, but it is necessary that the coagulum has sufficient cohesiveness that it be a unitary integral article. It is known that some latexes require minor treatment to aid their inherent film-forming characterisics, their casting ability, or their coagulability. For example, it is frequently advantageous to add to the latex a very small amount of a hydrophilic, colloidal thickener, such as water-soluble cellulose ethers, and to adjust the pH of the latex. Such techniques which enhance the film formability of the latex are intended to be within the scope of the invention.

The latexes may be prepared by any of the known procedures for polymerization in aqueous emulsion. Typically, the monomer or monomers are dispersed in an aqueous solution of from about 0.05 to 5% polymerization catalyst, such as potassium persulfate or hydrogen peroxide, and from about 0.05 to 5% of a surface active agent capable of emulsifying the monomers. Many such surface active agents are known. Polymerization is initiated by heating the emulsified mixture usually between 35° C. and 100° C. and continued by maintaining the polymerizing emulsion at the selected temperature. After the polymerization has reached the desired conversion of monomer to polymer, the latex is filtered to remove any precoagulum and stabilized to storage if necessary by the addition of a small amount of a surface active agent.

The preparation of other operable latex-like dispersions from condensation polymers, such as the polyamides, the polyolefins, such as polyethylene and other polymers, by methods other than emulsion polymerization of monomers will be equally well known.

The porosity (volume of void space as a percentage of the whole) of the coagulum depends upon the particular polymer employed, the nature and concentration of coagulant, and the temperature of coagulation. When a normally crystalline vinylidene chloride polymer latex is coagulated with the minimum amount of coagulant at room temperature, the void space of the coagulum or the porosity is about 60% of the volume of the coagulum. The present invention is operable with any porosity, although coagula with limited porosity may affect the efficacy of the present process.

Electrolyte coagulants that are useful in the continuous, localized coagulation of polymer latexes and latex-like dispersions are well known in the latex art. Typically, such coagulants are water-soluble inorganic salts of metallic cations. Although those salts of monovalent metallic ions such as sodium chloride and the like are operable, it it preferred to use those water-soluble salts of metallic cations having a valence greater than 1 because of their much stronger coagulating efficiency. Among the preferred materials are magnesium and calcium chlorides and aluminum sulfate. Other electrolyte coagulants will be known to the skilled worker. The coagulant is usually employed in an aqueous solution in a concentration of from about 0.5 to 20% by weight, although the minimum concentration required to coagulate the latex is to be preferred. Using more than the minimum amount necessitates excessive washing of the coagulum to remove the coagulant.

The adjuvants that may be utilized in the practice of the present invention to attain the stated objectives are azotic polymers having as an essential constituent of their polymeric structure characterizing proportions of one or more of the following recurring groups:

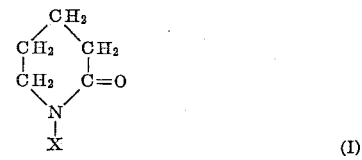

(N-monoethylenically unsaturated lactams)     (I)

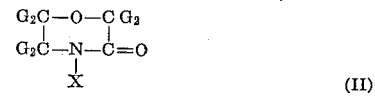

(N-monoethylenically unsaturated-3-morpholinones)     (II)

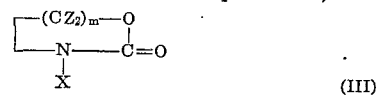

(N-monethylenically unsaturated-2-oxazolidinones and N-monoethylenically unsaturated-2-oxazinidinones)     (III)

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms, and aryl radicals containing from 6 to about 10 carbon atoms; X is selected from the group consisting of vinyl, isopropenyl, and allyl; and $m$ is an integer from 2 to 3.

Typical members of useful monomeric materials falling within the above concept including the following: N-vinyl-5,5-dimethyl-2-oxazolidinone; N-vinyl-5-butyl-2-oxazolidinone; N-vinyl-5-propyl-2-oxazolidinone; N-vinyl-4-ethyl-2-oxazolidinone; N-vinyl-4,5-diethyl-2-oxazolidinone; N-vinyl-3-morpholinone and its various alkyl ring-substituted monomeric homologues; various alkyl and aryl ring - substituted N - vinyl - 2-oxazinidinones; N-vinyl-2-piperidone; N-vinyl-3,3-piperidone; and the like and related monomeric N-vinyl heterocyclic amides and carbamates. Equally operable are the N-allyl and N-isopropenyl analogs of the above listed compounds.

The aforementioned N-heterocyclic monomers may be prepared by any of the reaction methods disclosed in U.S. 2,891,058, issued June 16, 1959. Basically, that patent teaches the preparation of such compounds by transvinylation or transisopropenylation wherein a suitable N-heterocyclic compound and an alkyl vinyl ether or an alkyl isopropenyl ether are caused to react in the presence of certain mercury salts of carboxylic acids. The skilled worker will be able to make judicious selection of reactants, catalysts, and reaction conditions for the preparation of any particular material.

As a preferred class of dye-assisting adjuvants, there may be mentioned the N-vinyl-2-oxazolidinone polymers having as an essential constituent of their polymeric structure characterizing proportions of the recurring group

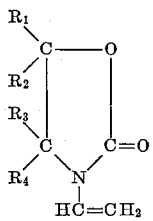

in which $R_1$, $R_2$, $R_3$, and $R_4$ can independently be either hydrogen or other substituent groups, particularly alkyl substituents containing from 1 to 4 carbon atoms and aryl substituents containing from 6 to 10 carbon atoms.

The azotic polymeric dye-assisting adjuvants may be a homopolymer of any of the above listed monomeric materials, may be a copolymer of two or more of such monomeric materials, or may be a co- or interpolymer of any of the N-heterocyclic monomers with another monoethylenically unsaturated comonomer. When such non-heterocyclic comonomer is employed in the preparation of the adjuvant, it has been found that to attain the desired level of dye-receptivity the adjuvant should contain at least about 50% of polymerically combined N-substituted heterocyclic monomer as defined earlier.

The azotic polymers that are so advantageously employed in the practice of the present invention, particularly the preferred poly-N-vinyl-2-oxazolidinone, are obtained by polymerizing the monomeric material containing the characterizing concentration of N-vinyl-2-oxazolidinone in the case of the preferred polymers under the influence of a free radical generating catalyst either in bulk or solution or by thermal polymerization in accordance with known procedures. Such methods of preparation quite readily can be conducted to result in polymers finding utility in the present invention. When the preferred N-vinyl-2-oxazolidinone monomers are used, these methods can initially form polymers having Fikentscher K-values greater than 10 as determined in water. The Fikentscher K-value of a polymeric substance is a quantity, as has been defined by Fikentscher in Cellulosechemie, 13, 60 (1932), that represents an approximate measure of the weight fraction of a given sample of polymer in an infinitesimal molecular weight range. According to a concept that is widely acceptable to those skilled in the art, it may be said to be in correlation, in an exponential manner, to the mean average molecular weight that obtains in a given sample of a polymer substance. Similar criteria for the other herein contemplated polymers will be equally apparent to the skilled worker.

It has been found that the azotic polymeric dye-assisting adjuvant, including the preferred N-vinyl-2-oxazolidinone polymer, may be utilized in the continuous, coherent articles in a concentration as high as 25 or more percent based on the weight of the fiber-, filament-, or film-forming polymer. Usually, however, suitable dye-receptivity and better article properties may be achieved when lesser proportions of the dye-assisting adjuvant are incorporated therein. When even 1% of the azotic polymer is incorporated in the article, there is an appreciable improvement in dye-receptivity. It is preferred to utilize between 5 to 10% based on the weight of the fiber-, filament-, or film-forming polymer of the beneficial adjuvants of this invention. The optimum amount to be used with any given polymeric material will be readily apparent following simple routine preliminary experiments.

It is known that aqueous solutions of N-vinyl-5-methyl-2-oxazolidinone and the 5-ethyl homologue exhibit unusual aqueous solubility characteristics at elevated temperatures. When the temperature of these solutions is raised, there is a point at which the solution becomes cloudy; and this, consequently, is known as the "cloud point" of that solution. It seems to be fundamental to the success of the present process that when aqueous solutions of these N-vinyl-5-alkyl-2-oxazolidinone polymers are employed, the solutions should be at or below the cloud point of that polymer. It is known that, as the temperature of a solution of these polymers is raised, there is a temperature at which a haziness or cloudiness develops. It is believed that this cloudiness is caused by physical rearrangements of the polymeric structure in such a way that the hydrophobic groups are more exposed on the surface of the molecule than are the hydrophilic groups. The result, in effect, is an insolubilization of that polymer. The effect is reversible and with a lowering of the temperature solubility is restored. However, for the possibility of permitting diffusion of the optimum concentration of dye-assistant into the microporous coagulum it is necessary that the solution of the N-vinyl-5-alkyl-2-oxazolidinone polymer be at or below the cloud point. It has been found that optimum incorporation of the dye-assistant is achieved when the solution is as close as possible to the cloud point without developing the insolubility. Accordingly, it is preferred to operate in this temperature range immediately below the cloud point. The cloud points for each of the N-vinyl-5-alkyl-2-oxazolidinone polymers will be known or may be readily determined by simple preliminary experiment.

Although water is to be preferred as the solvent or carrier for the dye-assisting adjuvant, it should be understood that other solvents may also be utilized. It is only necessary that the carrier be a solvent for the adjuvant and at the same time be a non-solvent for the organic, thermoplastic, resinous material. Many of the previously mentioned azotic polymeric materials are water soluble. However, when the substituent "G" is relatively large, the water solubility may decrease. Other solvents that may be considered for use with these dye-assisting adjuvants are a mixture of methyl alcohol and water and the chlorinated hydrocarbons including particularly methylene chloride and chloroform. The skilled worker will be able to make selection of the optimum solvent with but simple and routine preliminary experiments.

In one embodiment the polymer is formed into a continuous, coherent, microporous coagulum by continuously casting a polymer latex on a roll or other continuous surface which has been wetted with an electrolyte coagulant. The coagulum is water washed to remove substantially all of the coagulant and the excess water is removed by air drying, draining, or by the use of a device such as an air knife. The wet, porous coagulum is passed through a solution of the desired dye-assisting adjuvant in a non-solvent for the polymer after which the adjuvant-solvent (polymer non-solvent) is removed by drying. The porous coagulum is then fused to produce a continuous, coherent, fused article. When the porous coagulum is prepared from a crystalline polymer, the fused article is then subjected to the additional step of orientation by application of stress to the supercooled article.

It is only necessary that the continuous, coherent coagulum be in contact with the additive solution long enough for the solution to diffuse uniformly throughout the coagulum. That contact time will vary depending upon the porosity and thickness of the coagulum and on the surface tension or diffusibility of the additive solvent, as well as its miscibility with the water remaining in the coagulum after the excess is removed. It has been found that when treating films, tapes, filaments, and other similar articles which have at least one very small dimension, the contact time need be of but a few seconds duration. Because the process is capable of continuous operation, it may be integrated with other processing steps such as orientation, slitting, and marking and stamping.

The articles that are manufactured in accordance with the present invention have excellent physical properties and other desirable characteristics. They have a high capacity for and are readily and satisfactorily dyeable to deep and level shades with any of a wide variety of dyestuffs. For example, they may be easily and successfully dyed according to conventional procedures using basic, acid, vat, acetate, direct, naphthol, and sulfur dyes. Such varied and representative dyestuffs, by way of didactic illustration, as Calcocid Alizarine Violet, Sulfanthrene Red 3B, Amacel Scarlet BS, Calcodur Pink 2BL, Naphthol ASMX, Fast Red TRN Salt and Immedial Bordeaux G may advantageously be employed for such purposes.

Other dyestuffs, by way of further illustration, that may be utilized beneficially on the products of the invention include such direct cotton dyes as Chlorantine Fast Brown CCL, Chlorantine Fast Green 5BLL, Chlorantine Fast Red 7B, Pontamine Green GX Conc. 125%, Calcomine Black EXN Conc., Niagara Blue NR and Erie Fast Scarlet 4BA; such acid dyes as Anthraquinone Green GN, Anthraquinone Blue AB, Sulfonine Brown 2R, Sulfonine Yellow 2G, Neutracyl Brown RD, Xylene Milling Black 2L, Xylene Milling Blue FF, Xylene Fast Rubine 3GP PAT, Calcocid Navy Blue R Conc., Calcocid Fast Blue BL, Calcocid Milling Red 3R, Alizarine Levelling Blue 2R, Amacid Azo and Yellow G extra; such mordant-acid dyes as Alizarine Light Green GS, and Brilliant Alizarine Sky Blue BS PAT; such basic dyes as Brilliant Green Crystals, Du Pont Methylene Blue ZX, and Rhodamine B Extra S; such vat dyestuffs as Midland Vat Blue R Powder, Sulfanthrene Brown G Paste, Sulfanthrene Black PG Dbl., Sulfanthrene Blue 2B Dbl. paste, and Sulfanthrene Red 3B paste; Indigosol Green IB Powder, a soluble vat dyestuff; such acetate dyes as Celliton Fast Brown 3RA Extra CF, Celliton Fast Rubine BA CF, Artisil Direct Black BKZ, Artisil Direct Navy BR, Artisil Direct Red 3BP, Celanthrene Pure Blue BRS 400%, Celanthrene Red 3BN Conc., Acetamine Orange 3R Conc. and Acetamine Yellow N; β-naphthol-2-chloro-4-nitroaniline, an azoic dye; such sulfur dyes as Katigen Brilliant Blue GGS High Conc. and Indo Carbon CLGS; and premetallized dyestuffs including Cibalan Yellow GRL and Supralan Blue NB.

The present process provides, as mentioned, greatly improved dye-receptivity to the indicated articles. In addition, with chloroethylene polymeric materials as the article-forming polymer the resulting articles exhibit improved heat and light stability, increased moisture pickup, and improved static behavior.

The advantages and benefits accruing from the present invention will be more apparent from the following illustrative examples wherein all parts and percentages are by weight.

*Example 1*

A latex was prepared by the emulsion polymerization of comonomers composed of 97% vinylidene chloride and 3% acrylonitrile. The latex was filtered to remove precoagulum and the latex found to contain about 40% nonvolatile solids. A continuous belt was wetted with a 20% aqueous calcium chloride solution and subsequently brought into contact with the latex. A continuous, coherent coagulum of about 60% porosity formed immediately. The coagulum was water washed. Excess water was removed from the coagulum by means of an air knife. A 0.5 gram sample of this unfused coagulum was immersed in 50 cubic centimeters of 1% solution of poly-N-vinyl-2-oxazolidinone in 0.5% aqueous sodium chloride solution at 25° C. After one minute, the film was removed and dried. After air drying for 3 hours, the weight increase was determined. The treated film was fused for 30 seconds at 200° in an oven, then cooled and stretched. The dyeing procedure was carried out by immersing the stretched film sample in a 0.1% solution of crystal violet at 50° C. for 5 minutes, followed by washing.

The procedure was repeated except that the 1% poly-N-vinyl-2-oxazolidinone (PVO) solution was heated to about 90° C. where a cloudiness is just perceptible. In a similar manner other samples of the same coagulum were treated with a 1% solution poly-N-vinyl-5-methyl-2-oxazolidinone (PVO–M). The results are listed in the following table. In the results the dye intensity is in a relative intensity scale.

TABLE 1

| Polymer Used | Wt. Pickup 25° (Percent) | Dye Intensity 25° | Wt. Pickup Cloud Pt. (Percent) | Dye Intensity Cloud Pt. |
|---|---|---|---|---|
| Blank | 0 | 1 | 0 | 1 |
| PVO | 4.1 | 3 | 8.6 | 10 |
| PVO–M | 1.1 | 2 | 26.9 | 100 |

*Example 2*

A sample of the coagulum of Example 1 was dipped in a 2.5% solution of poly-N-vinyl-2-oxazolidinone, immediately removed, and air dried for about one hour, then fused in an oven at 200° C. for 15 seconds' exposure. Oriented samples of these were exposed for 3 hours at 150° C. The sample was pale yellow, whereas an untreated control turned dark brown.

*Example 3*

The coagulum of Example 1 was slit into ribbons ⅜ inch wide, then dried, and then passed through a bath of 5% poly-N-vinyl-2-oxazolidinone. Other ribbons were passed through a bath of 5% poly-N-vinyl pyrrolidone (PVP). Still others were left untreated as a control. The samples were dried, fused, and oriented by means of a longitudinal stress. The oriented filaments were exposed in an Atlas Fadeometer to determine light stability. The results are listed in the following table:

TABLE 2

| Sample | Hours to Noticeable Discoloration (Hunter ΔE of 6) | Hours to Color Failure (Hunter ΔE of 10) |
|---|---|---|
| Blank | 38 | 110 |
| 5% PVO | 61 | 156 |
| 5% PVP | >5 | 15 |

The beneficial results and advantages evidenced in the above examples are also noticed when the polymeric material is a copolymer of vinylidene chloride with either ethyl acrylate, butyl acrylate, or 2-ethylhexyl acrylate as the comonomer with copolymers of vinylidene chloride and vinyl chloride or vinyl acetate with terpolymers of vinylidene chloride and vinyl chloride with either acrylonitrile, a lower alkyl acrylate, a lower alkyl methacrylate, butadiene or vinyl acetate as the termonomeric material. Likewise, microporous structures prepared from polyvinyl chloride, polystyrene, and polyethylene are also rendered more dye-receptive when treated in the method of the present invention. In like manner, similar menefits are observed when the azotic polymer is selected from the polymers of any of the following: N-vinyl-5,5-dimethyl-2-oxazolidinone; N-vinyl-5-butyl-2-oxazolidinone; N-vinyl-5-propyl-2-oxazolidinone; N-vinyl-4-ethyl-2-oxazolidinone; N-vinyl-4,5-diethyl-2-oxazolidinone; N-vinyl-3-morpholinone.

What is claimed is:
1. A process for preparing articles of enhanced dye-receptivity comprising the procedural sequence of (1) immersing a microporous coagulum of an organic, thermoplastic, resinous material in a solution of an azotic polymeric dye-assisting adjuvant selected from the group consisting of addition polymers of at least about 50% by weight based on the weight of the azotic polymers of (a) N-monoethylenically unsaturated lactam monomers of the formula:

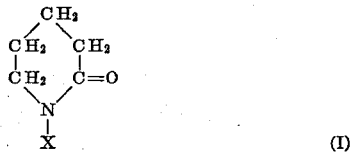

(b) N - monoethylenically unsaturated-3-morpholinones of the formula:

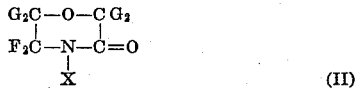

and (c) N-monoethylenically unsaturated cyclic carbamates of the formula:

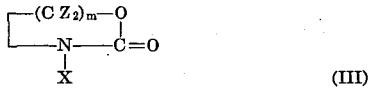

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms, and aryl radicals containing from 6 to about 10 carbon atoms; X is selected from the group consisting of vinyl, isopropenyl, and allyl; and $m$ is an integer from 2 to 3, in a non-solvent for said organic, thermoplastic, resinous material; (2) drying the so-treated microporous coagulum at a temperature below the fusion temperature of said organic, thermoplastic resinous material; and (3) subjecting the dried microporous coagulum to elevated temperature to fuse said coagulum into a continuous, coherent, integral article.

2. A process for preparing articles of enhanced dye-receptivity comprising the procedural sequence of (1) forming a continuous, coherent, microporous coagulum by the localized electrolyte coagulation at a temperature below the fusion temperature of the polymer of an electrolyte-coagulable, film-forming latex of an organic, thermoplastic, resinous material, said latex containing at least about 30% by weight of polymer solids; (2) washing said continuous, coherent, microporous coagulum with water to remove substantially all of the electrolyte coagulant; (3) draining and volatilizing excess water from the washed coagulum without destroying the microporous structure; (4) immersing said coagulum in a solution of an azotic polymeric dye-assisting adjuvant selected from the group consisting of addition polymers of at least about 50% by weight based on the weight of the azotic polymers of (a) N-monoethylenically unsaturated lactam monomers of the formula:

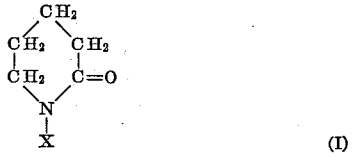

(b) N-monoethylenically unsaturated-3-morpholinones of the formula:

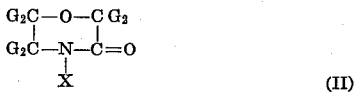

and
(c) N-monoethylenically unsaturated cyclic carbamates of the formula:

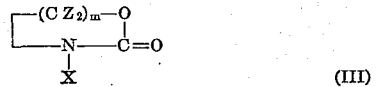

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms, and aryl radicals containing from 6 to about 10 carbon atoms; X is selected from the group consisting of vinyl, isopropenyl, and allyl; and $m$ is an integer from 2 to 3, in a non-solvent for the polymer of said latex until said solution has diffused through said coagulum; (5) drying said coagulum at a temperature below the fusion temperature of the organic, thermoplastic, resinous material; and (6) subjecting said dry coagulum to elevated temperature to fuse said coagulum into a continuous, coherent, integral article.

3. The process claimed in claim 2 wherein said organic, thermoplastic, resinous material is a normally crystalline polymeric material.

4. The process claimed in claim 3 wherein said normally crystalline polymeric material is a normally crystalline vinylidene chloride polymer containing at least 70% by weight vinylidene chloride polymerized therein with any remainder being of a monoethylenically unsaturated comonomer.

5. The process claimed in claim 4 wherein said comonomer is acrylonitrile.

6. The process claimed in claim 4 wherein said comonomer is a lower alkyl acrylate.

7. The process claimed in claim 2 wherein said azotic polymeric dye-assisting adjuvant is an N-vinyl-2-oxazolidinone polymer.

8. The process claimed in claim 7 wherein said azotic polymeric dye-assisting adjuvant is poly-N-vinyl-2-oxazolidinone.

9. The process claimed in claim 7 wherein said azotic polymeric dye-assisting adjuvant is poly-N-vinyl-5-methyl-2-oxazolidinone.

10. A continuous, coherent article composed of an organic, thermoplastic, resinous material and uniformly dispersed therethrough quantities of an azotic polymeric dye-assisting adjuvant selected from the group consisting of addition polymers of at least about 50% by weight based on the weight of the azotic polymers of (a) N-monoethylenically unsaturated lactam monomers of the formula:

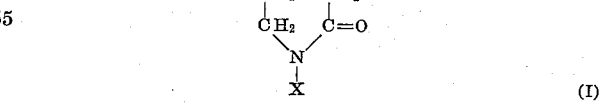

(b) N-monoethylenically unsaturated-3-morpholinones of the formula:

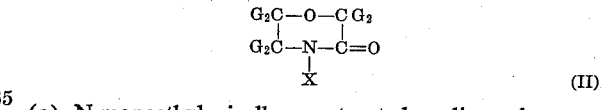

(c) N-monoethylenically unsaturated cyclic carbamates of the formula:

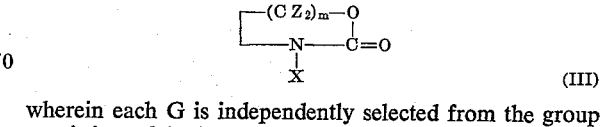

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms, and aryl radicals containing from 6 to about 10 carbon atoms; X is selected from the group consisting of vinyl, isopropenyl, and allyl; and $m$ is an integer from 2 to 3.

11. The filamentary article claimed in claim 10 wherein said organic, thermoplastic, resinous material is a normally crystalline polymeric material.

12. The article claimed in claim 11 wherein said normally crystalline polymeric material is a normally crystalline vinylidene chloride polymer containing at least 70% by weight vinylidene chloride polymerized therein with any remainder being of a monoethylenically unsaturated comonomer.

13. The article claimed in claim 12 wherein said comonomer is acrylonitrile.

14. The article claimed in claim 12 wherein said comonomer is a lower alkyl acrylate.

15. The article claimed in claim 10 wherein said azotic polymer is an N-vinyl-2-oxazolidinone polymer.

16. The article claimed in claim 15 wherein said azotic polymer is poly-N-vinyl-2-oxazolidinone.

17. The article claimed in claim 15 wherein said azotic polymer is poly-N-vinyl-5-methyl-2-oxazolidinone.

18. The article claimed in claim 10 wherein said azotic polymer is present in an amount of not more than about 25% by weight of the organic, thermoplastic, resinous material.

References Cited by the Examiner

UNITED STATES PATENTS

| | | | |
|---|---|---|---|
| 2,853,465 | 9/1958 | Werner | 260—895 |
| 2,858,186 | 10/1958 | Frost | 18—54 |
| 2,931,694 | 4/1960 | Wirth et al. | 260—895 |
| 2,960,725 | 11/1960 | Le Fevre | 18—54 |
| 2,971,937 | 2/1961 | Ham et al. | 260—895 |
| 2,997,499 | 8/1961 | Armen et al. | 260—895 |

MURRAY TILLMAN, *Primary Examiner.*

DANIEL ARNOLD, LEON J. BERCOVITZ, BERNARD S. LEON, JOSEPH A. KOLASCH,
*Assistant Examiners.*